US009457949B1

(12) United States Patent
Hathaway, III

(10) Patent No.: US 9,457,949 B1
(45) Date of Patent: Oct. 4, 2016

(54) PERSONALIZED IDENTIFICATION SYSTEM FOR DECEASED BODIES

(71) Applicant: William S. Hathaway, III, Fall River, MA (US)

(72) Inventor: William S. Hathaway, III, Fall River, MA (US)

( * ) Notice: Subject to any disclaimer, the term of this patent is extended or adjusted under 35 U.S.C. 154(b) by 0 days.

(21) Appl. No.: 14/513,500

(22) Filed: Oct. 14, 2014

Related U.S. Application Data

(60) Provisional application No. 61/892,562, filed on Oct. 18, 2013.

(51) Int. Cl.

| | |
|---|---|
| ***B25B 11/00*** | (2006.01) |
| ***B29C 65/00*** | (2006.01) |
| ***B29C 65/02*** | (2006.01) |
| ***B29C 65/28*** | (2006.01) |
| ***B32B 37/06*** | (2006.01) |
| ***B32B 38/14*** | (2006.01) |
| ***B44D 5/00*** | (2006.01) |
| ***B65D 81/38*** | (2006.01) |
| ***A61G 99/00*** | (2006.01) |

(52) U.S. Cl.
CPC ........... *B65D 81/3888* (2013.01); *A61G 99/00* (2013.01)

(58) Field of Classification Search
USPC ....... 220/560.01; 269/287; 29/559; 156/230, 156/234, 235, 240, 277, 82
See application file for complete search history.

(56) References Cited

U.S. PATENT DOCUMENTS

| | | | | |
|---|---|---|---|---|
| 87,570 | A | 3/1869 | Joyce | |
| 186,650 | A | 1/1877 | White | |
| 941,044 | A | 11/1909 | Rivers | |
| 1,169,157 | A | 1/1916 | Honold | |
| 1,510,972 | A | 10/1924 | Beam | |
| 2,970,076 | A | 1/1961 | Porth | |
| 3,770,553 | A * | 11/1973 | Hannon | B32B 37/142 100/324 |
| 3,874,979 | A * | 4/1975 | Hannon | B32B 37/142 156/538 |
| 4,023,316 | A * | 5/1977 | Martin | E04H 13/006 52/100 |
| D257,183 | S | 9/1980 | Bruce et al. | |
| 4,360,953 | A | 11/1982 | Angermann | |
| 4,757,760 | A * | 7/1988 | Nihara | B41J 35/26 101/93.05 |
| 4,874,454 | A | 10/1989 | Talalay et al. | |
| 4,888,230 | A | 12/1989 | Cutright | |
| 5,197,169 | A | 3/1993 | Gordon | |
| 5,261,257 | A * | 11/1993 | Collier | A44B 15/002 24/576.1 |
| 5,520,036 | A * | 5/1996 | Collier | A44B 15/002 24/576.1 |

(Continued)

FOREIGN PATENT DOCUMENTS

| | | |
|---|---|---|
| JP | 9-226031 | 9/1997 |

OTHER PUBLICATIONS

A. Sonntag et al., "New Kiln Furniture Solutions for Technical Ceramics," Process Engineering, cfi/Ber. DKG 86 (2009), No. 4, pp. E29-E34.

*Primary Examiner* — Sing P Chan
(74) *Attorney, Agent, or Firm* — Salter & Michaelson

(57) ABSTRACT

A system for applying a personal message to a heat resistant cameo that is intended to be included with a deceased person during a cremation process. The system includes a holder having a middle passage constructed and arranged to receive the cameo therein with the cameo having a predetermined inscription surface upon which a personal message can be inscribed; a transfer sheet with the holder retaining the transfer sheet and being constructed and arranged to stretch the transfer sheet over the inscription surface of the cameo; and a mask that is disposed over the transfer sheet. The mask has a middle hole therein that is aligned with the middle passage of the holder.

13 Claims, 10 Drawing Sheets

(56) References Cited

U.S. PATENT DOCUMENTS

| | | | | |
|---|---|---|---|---|
| 5,533,241 | A | 7/1996 | McConnell | |
| 5,716,668 | A | 2/1998 | Porte et al. | |
| 5,913,607 | A | 6/1999 | Lengyel, Sr. | |
| 6,073,320 | A | 6/2000 | Salatin et al. | |
| 6,254,152 | B1 | 7/2001 | Tillett | |
| 6,408,301 | B1 | 6/2002 | Patton et al. | |
| 6,467,635 | B1 | 10/2002 | McComb et al. | |
| 6,948,271 | B2 | 9/2005 | Helgeson et al. | |
| 6,975,233 | B2 | 12/2005 | Grose et al. | |
| 7,136,866 | B2 | 11/2006 | Springer, Jr. et al. | |
| 7,210,203 | B1 | 5/2007 | Wimprine, Jr. | |
| 7,318,261 | B2 | 1/2008 | Bills | |
| 7,404,243 | B1 | 7/2008 | Sauder et al. | |
| 7,444,725 | B1 | 11/2008 | Wimprine, Jr. | |
| 7,512,578 | B2 | 3/2009 | Abnous et al. | |
| 7,582,175 | B2 * | 9/2009 | Trejo-Rincon | B44C 1/26 144/351 |
| 7,603,386 | B2 | 10/2009 | Amarendran et al. | |
| 7,621,575 | B1 | 11/2009 | Kellerman | |
| 7,622,237 | B2 | 11/2009 | Banhazl | |
| 7,788,247 | B2 | 8/2010 | Wang et al. | |
| 7,788,297 | B2 | 8/2010 | Weir et al. | |
| 7,860,887 | B2 | 12/2010 | Cohen et al. | |
| 7,874,050 | B2 | 1/2011 | Bills | |
| 7,877,847 | B2 | 2/2011 | Bills | |
| 7,941,596 | B2 | 5/2011 | Ballard et al. | |
| 7,970,743 | B1 | 6/2011 | Kilday et al. | |
| 8,034,451 | B2 | 10/2011 | Spacie et al. | |
| 8,041,074 | B2 | 10/2011 | Rhoads et al. | |
| 8,056,112 | B2 | 11/2011 | Lee | |
| 8,131,780 | B2 | 3/2012 | Amarendran et al. | |
| 8,171,049 | B2 | 5/2012 | Ah-Pine et al. | |
| 8,726,828 | B2 * | 5/2014 | Joo | G03F 7/16 118/319 |
| 2001/0014253 | A1 * | 8/2001 | Shiokawa | F16B 37/122 403/408.1 |
| 2004/0003742 | A1 | 1/2004 | Geddes et al. | |
| 2004/0095242 | A1 | 5/2004 | Grose et al. | |
| 2005/0050700 | A1 | 3/2005 | Davis et al. | |
| 2005/0153031 | A1 * | 7/2005 | Man | A23B 4/20 426/332 |
| 2005/0159324 | A1 * | 7/2005 | Man | A23B 4/20 510/218 |
| 2008/0131829 | A1 | 6/2008 | Orton | |
| 2009/0026160 | A1 | 1/2009 | Wright et al. | |
| 2009/0081403 | A1 * | 3/2009 | Trejo-Rincon | B44C 1/26 428/67 |
| 2010/0304152 | A1 | 12/2010 | Clarke | |
| 2012/0007971 | A1 * | 1/2012 | Schnitzer | G01N 21/87 348/61 |
| 2013/0015191 | A1 | 1/2013 | Seagle et al. | |
| 2013/0086780 | A1 | 4/2013 | Grover | |
| 2013/0333308 | A1 * | 12/2013 | Kumar | E04B 1/04 52/155 |
| 2014/0123450 | A1 | 5/2014 | Jenson | |
| 2015/0204100 | A1 * | 7/2015 | Kumar | E04C 3/34 52/165 |
| 2016/0004926 | A1 * | 1/2016 | Kerner | G01B 11/24 348/46 |

* cited by examiner

PERSONALIZED IDENTIFICATION SYSTEM FOR DECEASED BODIES

RELATED CASE

Priority for this application is hereby claimed under 35 U.S.C. §119(e) to commonly owned and U.S. Provisional Patent Application No. 61/892,562 which was filed on Oct. 18, 2013 and which is incorporated by reference herein in its entirety.

FIELD OF THE INVENTION

The present invention relates in general to a personalized identification system for deceased bodies. More particularly, the present invention relates to such a system and associated method that provides and protects a remembrance stone or cameo that is maintained with the deceased during the cremation process.

BACKGROUND AND OBJECTIVES OF THE INVENTION

A cremation process is now commonly used as a substitute for a conventional burial. Over the past several years, the cremation process has been increasingly adopted. In 1973, 4 percent of deceased bodies at funeral homes were cremated. The percentage of cremations is now at 40 percent and is anticipated as increasing further. With the more conventional burial involving a casket the family, in order to personally oversee each step of the process; the casket can contain memorial items that help in keeping memories alive. However, the cremation process has remained less personalized.

Accordingly, one objective of the present invention is to provide a remembrance stone or cameo which can be readily personalized and is meant to accompany the cremation process. This remembrance stone or cameo provides a unique keepsake that is returned with the cremated remains as a lasting memorial and as an extra assurance that the cremation was completed properly. The remembrance stone or cameo may be in the form of a durable ceramic marker.

Another important objective and aspect of the present invention is the use of a high temperature fabric that is flexible and which is used for retaining the remembrance stone or cameo so as to protect it from external environmental elements that occur during the cremation process.

RELATED PRIOR ART

For example, U.S. Pat. No. 6,948,271 to Helgeson et al. describes an identification system that includes an identification tag, such as a band, that is attached the body of the deceased person. The identification tag is meant to remain intact throughout the burial or cremation process. This system is used primarily for identification purposes and does not address the issue of providing a personalized message.

U.S. Pat. No. 7,444,725 to Wimprine also describes an identification system. This system also employs a personalized jewelry item that may be placed in two separate locations on the deceased body. The components of the personalized jewelry, such as a bracelet, are made from material for withstanding the conditions for cremation. This system does provide for a personalized message on the item of jewelry, but the jewelry has to be attached to the deceased.

U.S. Pat. No. 7,318,261 to Bills describes a synthetic biometric article that is used in a cremation process. This patent also describes the use of a cremation cameo and a synthetic biometric article or articles placed with the deceased individual. The aforementioned cameo is described as including a relief carving on the front side and bears the name of the deceased on the back side of the cameo.

Accordingly, in the prior art, although items such as bracelets or cameos are used and carry a personalized message, when such items are subjected to the cremation process, the bracelet or cameo can be severely damaged and thus would not be in a suitable form to use as a keepsake. Moreover, the prior art requires that the cameo be supported on the deceased. Also, the prior art does not teach an effective way to provide the personalized message on the cameo or marker so as to effectively survive the excess heat created during the cremation process.

BRIEF SUMMARY OF THE INVENTION

In order to protect the remembrance stone or cameo, in accordance with the present invention, there is described the use of a high temperature fabric that is constructed of a flexible insulating material. The remembrance stone or cameo is protected by this fabric material. The fabric material is preferably provided in a flexible envelope, sleeve, or pouch into which the ceramic remembrance stone or cameo is placed to protect it from external environmental elements, particularly as occur in a cremation process.

In accordance with another aspect of the present invention there is provided a system for protecting a remembrance stone or cameo that is intended to be included with the deceased during a cremation process, including a flexible sheet of a high-temperature fabric material that receives and seals about the remembrance stone or cameo. This may include an interior surface coating on the sleeve so that chemical reactions induced by the high temperature environment alter the appearance, patina, and aesthetics of the outer surface of the remembrance stone or cameo. In various embodiments the sleeve is sealed by means of a flap; by means of the application of a high-temperature adhesive; by means of a stitching; or may be sealed by the application of a mechanical clip or clamp.

In accordance with another aspect of the present invention, the envelope, sleeve, or pouch may be coated on an interior surface with colorants and other organic and/or inorganic compounds and materials to provide a chemical reaction that is induced by a high temperature environment. This enables the remembrance stone or cameo to proceed through a cremation process without being damaged and furthermore enables the remembrance stone or cameo to be altered in appearance, patina, or chemical composition of the ceramic that is contained within the envelope, sleeve, or pouch. This produces a desired artistic, esthetic and/or technical transformation of the remembrance stone or cameo.

In accordance with another version of the present invention there is provided a system for applying a personal message to a heat resistant cameo that is intended to be included with a deceased person during a cremation process. The system comprises: a holder having a middle passage constructed and arranged to receive the cameo therein; the cameo having a predetermined inscription surface upon which a personal message can be inscribed; a transfer sheet; the holder retaining the transfer sheet and being constructed and arranged to stretch the transfer sheet over the inscription surface of the cameo; and a mask that is disposed over the transfer sheet; the mask having a middle hole therein that is aligned with the middle passage of the holder.

In accordance with other aspects of the present invention the holder is comprised of a planar board member; including a stylus for inscribing a personal message by contact with one side of the transfer sheet that is stretched over the inscription surface of the cameo; the planar board member has a series of relief slits disposed about the middle passage; the mask is a flexible plastic layer that is attached at one side to the planar board member; the passage in the planar board member has a cross dimension that is greater than the cross dimension of the hole in the mask; and including a second mask having an inscription opening and that is disposed outside of the transfer sheet for the purpose of forming a logo or the like on the transfer sheet.

In accordance with still other aspects of the present invention there is provided method of inscribing a personal message to a heat resistant cameo that is intended to be included with a deceased person during a cremation process, said method comprising:

providing a holder having a middle passage constructed and arranged to receive the cameo therein, said cameo having a predetermined inscription surface upon which a personal message is to be inscribed;

providing a transfer sheet behind the holder;

placing the cameo through the middle passage while the holder retains the transfer sheet to stretch the transfer sheet over the inscription surface of the cameo;

providing a mask that is disposed over the transfer sheet;

said mask having a middle hole therein that is aligned with the middle passage of the holder; and placing the mask so that the middle hole is in alignment with the holder passage.

In accordance with still further aspects of the present invention including providing a stylus for writing against the transfer sheet; including providing relief slits about the passage in the holder in order to allow for limited expansion of the passage in the holder when the cameo is inserted in the holder; the transfer sheet is a separate sheet inserted between the holder and mask; including supporting the mask from the holder fixed along one side of the mask; and including providing a second mask having an inscription opening and disposing the second mask outside of the transfer sheet for the purpose of forming a logo or the like on the transfer sheet.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Figure 1:
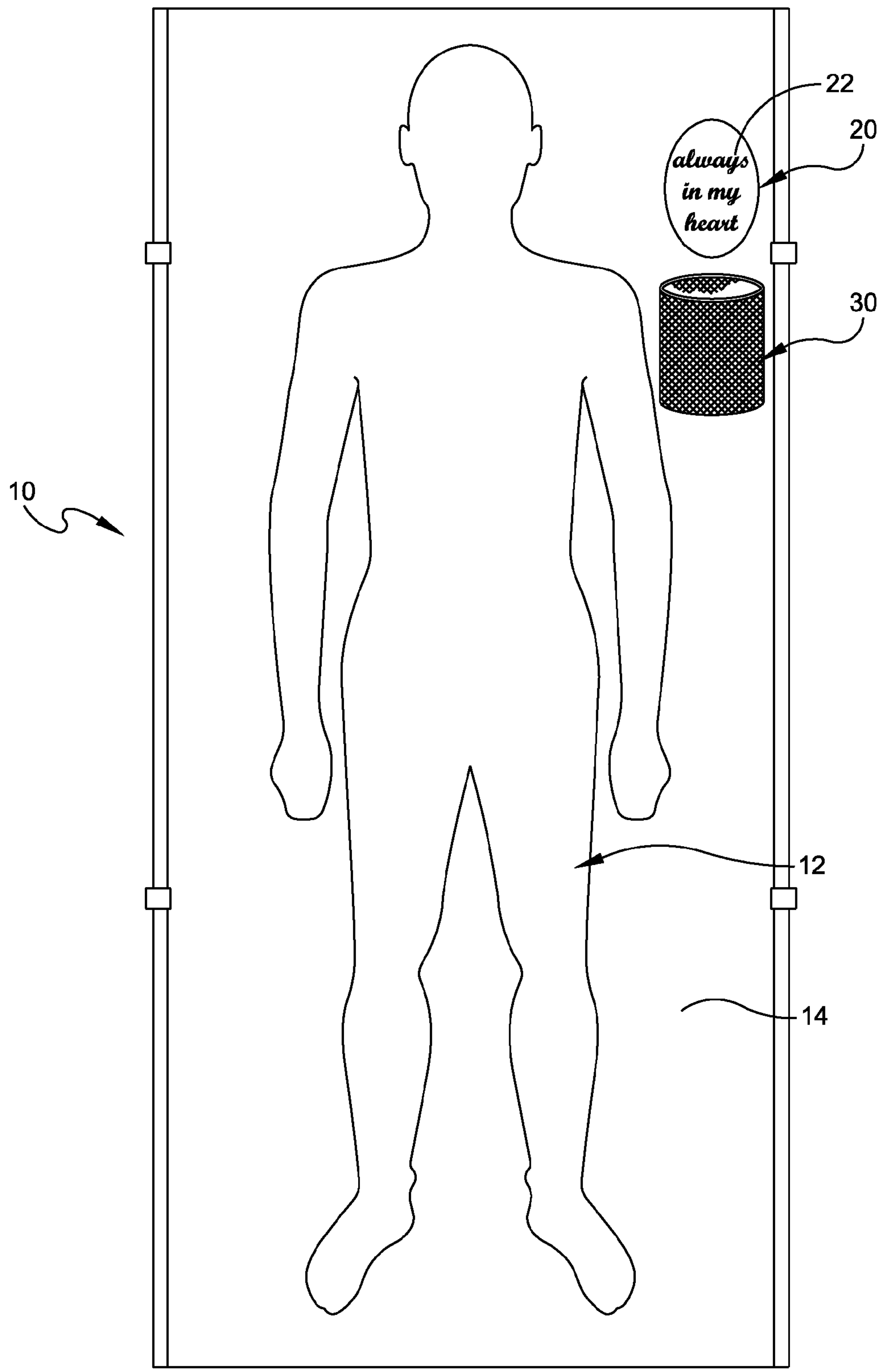
FIG. 1 illustrates the deceased accompanied by the remembrance stone or cameo of the present invention.
Figure 2:
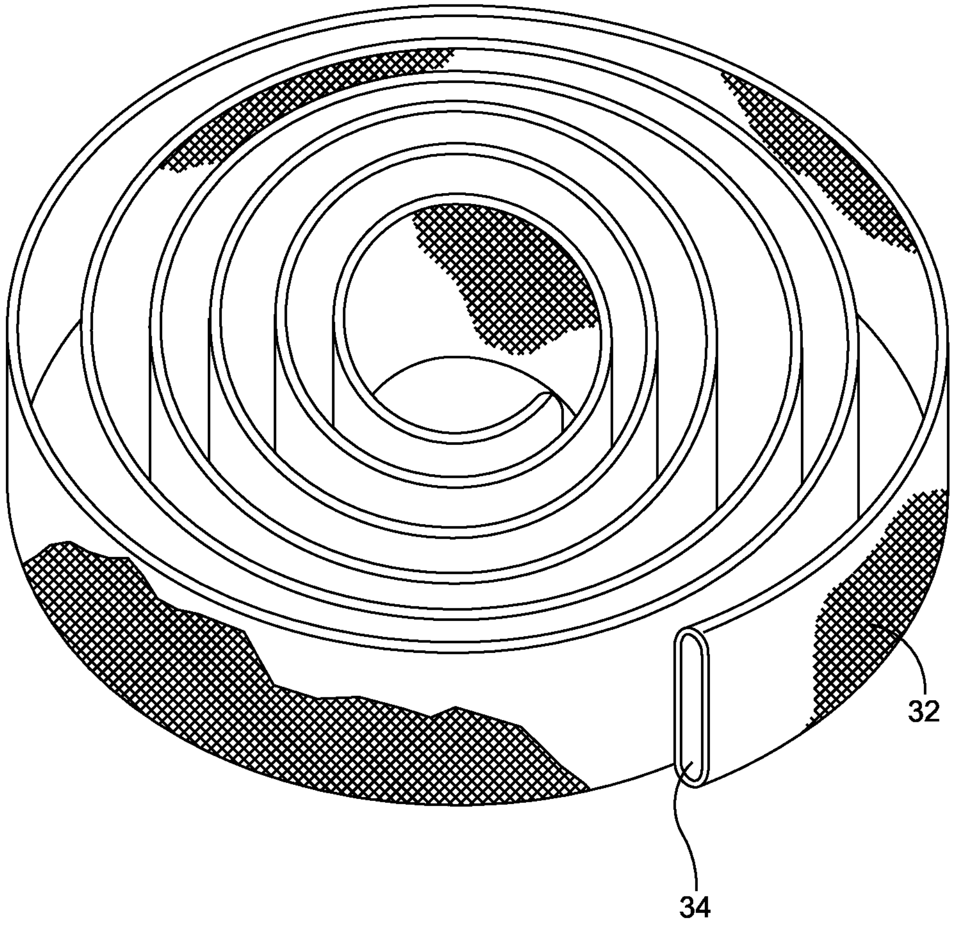
FIG. 2 is a perspective view illustrating a woven sleeve of material used in forming the envelope, sleeve, or pouch of the present invention.

With reference to the drawings, in FIG. 1 there is illustrated a site 10 that depicts the deceased individual 12 as positioned on a surface 14 which is capable of withstanding the elevated temperatures used during a cremation process. Also illustrated in FIG. 1 is the remembrance stone or cameo 20 as provided in accordance with the present invention. The remembrance stone or cameo is illustrated as having personal messages inscribed thereon at 22. A technique for inscribing these messages is described in further detail hereinafter.

The remembrance stone or cameo 20 is constructed of a cremation compatible material as it is to withstand temperatures as high as approximately 1600° F. (871° C.) to 1800° F. (982° C.). The material of the remembrance stone or cameo 20 is constructed so that it can survive the direct flame and heat used to reduce the human remains to ash during the cremation process. Suitable cremation compatible materials include porcelains, ceramics, polymers, and composites, for example. For further descriptions of cremation compatible materials, refer to the Bills U.S. Pat. No. 7,318,261, the entire contents of which is hereby incorporated by reference herein.

Because of the intense heat during the cremation process, it has been found that, to provide a sufficiently appealing keepsake, in accordance with the present invention there is provided a sleeve 30 schematically depicted in FIG. 1 for receiving the remembrance stone or cameo 20. This sleeve 30 is preferably in the form of a high-temperature fabric that is flexible and constructed of an insulating material. For example, the sleeve may be constructed of a treated fiberglass, woven ceramics, and other similar materials. The sleeve 30 is thus a flexible envelope or pouch into which the cameo 20 may be placed to protect it from the external environmental conditions that exist during an intense cremation process.

Thus, in accordance with the present invention, it is desired to use a high temperature flexible insulating cloth to protect the remembrance stone or cameo throughout the entire cremation process. In that way, any writing or symbology placed on the cameo is preserved from the material floating around inside the crematory retort. The cremation environment is intense and may create many chemical interactions that can adversely affect the ceramic material of the cameo. Thus, in accordance with the present invention, there is provided a pouch, sleeve, or envelope made of a temperature-resistant material. One such material is vermiculite-coated fiberglass or spun ceramic which can keep these undesired substances off the immediate surface of the remembrance stone or cameo, thus keeping the remembrance stone or cameo generally cleaner and free of debris during the cremation process. After the cremation process, the sleeve 30 may be discarded and the remembrance stone or cameo is maintained as a keepsake or memorial to the deceased person.

Figure 3:
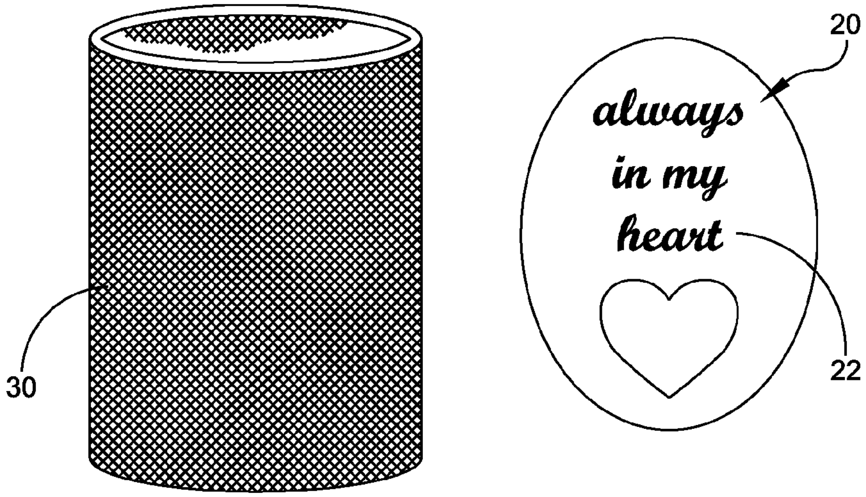
FIG. 3 illustrates a section of the woven roll of FIG. 2 cut to form a short length sleeve; and an inscribed cameo.
Figure 4:
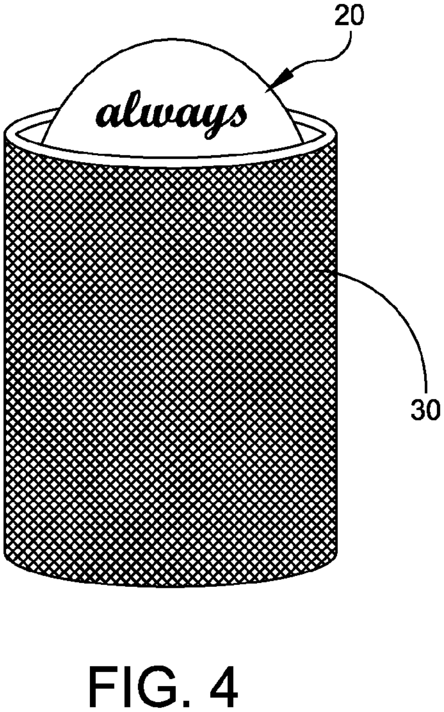
FIG. 4 is an exploded perspective view illustrating the cameo fitting within the formed sleeve.
Figure 5:
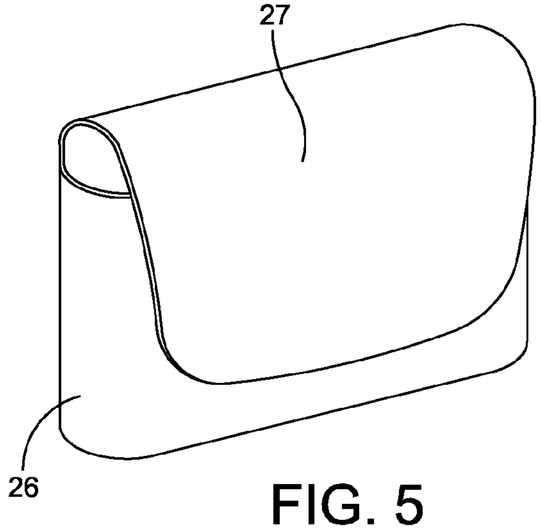
FIG. 5 schematically depicts an embodiment in which the remembrance stone or cameo is in the form of a bag with a flap.

Reference is now made to FIGS. 2-5 herein for further details of structures that can be used in forming the sleeve 30 depicted in FIG. 1. Thus, the flexible sleeve 30 may take on a number of different forms and use a variety of different construction materials depending on the particular environment and the construction of the cameo itself. The sleeve itself may be formed from the roll 32 depicted in FIG. 2. It is noted that the roll 32 has a substantial length but is provided in adjacent layers that form an open end 34. FIG. 3 illustrates a section of the sleeve 30 cut from the roll 32. FIG. 3 also illustrates the remembrance stone or cameo at 20 with personalized inscriptions at 22. The sleeve 30 depicted in FIGS. 3 and 4 may be cut to a length slightly longer than the length of the cameo 20. In FIGS. 3 and 4 the interior surface of the sleeve may remain untreated, in which case the cameo is only protected from external elements in the firing environment. Alternatively, the interior surface of the sleeve may be treated with organic and/or inorganic substances and combined with a binding or gluing agent which coats the interior surface and provide the basis for deliberate color changes in the remembrance stone or cameo, as discussed in further detail hereinafter.

For larger remembrance stones or cameos, a bag 26 constructed of a material similar to the sleeve 30 depicted in FIGS. 3 and 4. The bag 26 is preferably provided with a flap 27. As with the sleeve, the interior surface of the bag or pouch 26 can be coated with colorant materials in order to impact the final finish of the cameo, or the surface can remain plain if the cameo only needs to be protected from the normal environmental elements in the cremation process.

Thus, in accordance with the present invention, the sleeve construction is formed of a high-temperature fabric that may be woven or unwoven and is capable of protecting the remembrance stone or cameo. It has been found that Type E fiberglass fabrics withstand continuous exposure to temperatures up to at least 1100° F. These fiberglass sleeves, when coated with vermiculite, can withstand continuous temperatures of at least 1500° F. This is considered to be sufficient for the protection of the cameo when placed with human remains. Moreover, silicon oxide-based fabrics and sleeves can withstand temperatures in excess of 2000° F.

Figure 6:
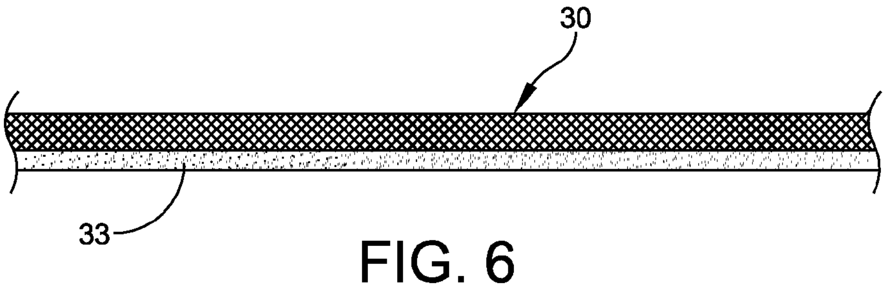
FIG. 6 is a fragmentary cross sectional view illustrating a further aspect of the present invention in which the inside of the fabric is coated with a material for enhancing the remembrance stone or cameo surface during the cremation process.

As indicated previously, these pouches or sleeves may be coated on an interior surface as illustrated in the fragmentary view of FIG. 6. In FIG. 6 there is illustrated a portion of the sleeve 30 with an interior coating indicated at 33. These coatings may comprise other organic and/or inorganic compounds and materials so that chemical reactions induced by the high temperature environment will alter the appearance, patina, or chemical composition of the remembrance stone or cameo.

Although the concepts of the present are described in particular in relationship to a cremation process, it is noted that the techniques described herein may also have wider application. The interior coating can in particular be useful in production environments where a similar outcome is to be applied to multiple pieces or production run. It can also be helpful in learning environments where students are learning the rudiments of the transformation of a ceramic piece whereby the prepared sleeve provides a consistent experience for the learner.

Figure 7:
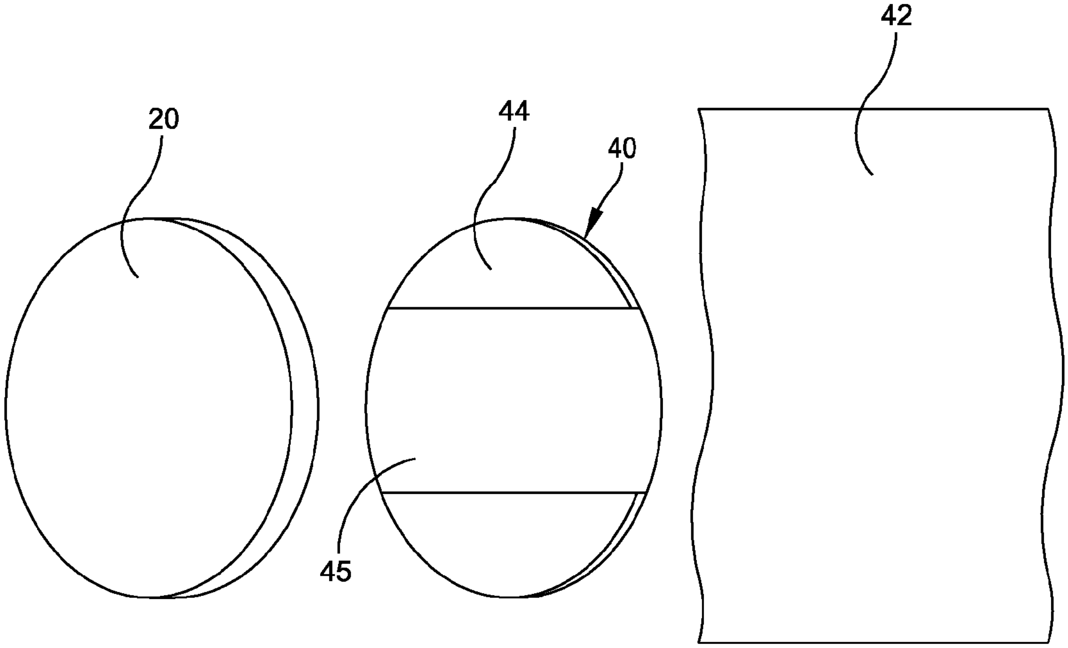
FIG. 7 is an exploded perspective view illustrating a further concept of the present invention and incorporating a holder for a transfer sheet which incorporates a mask.
Figure 8:
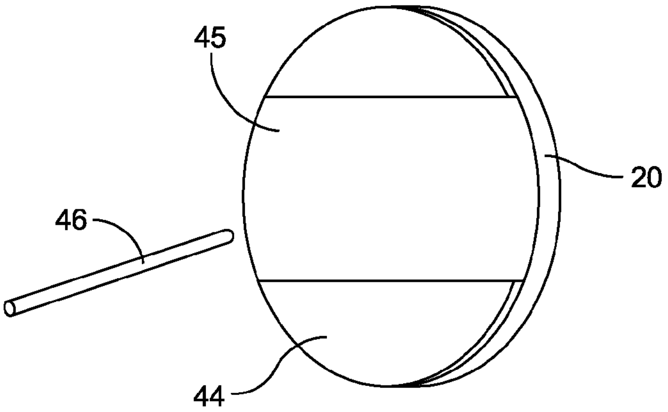
FIG. 8 is a plan view illustrating the remembrance stone or cameo, the holder, transfer sheet, and the use of a stylus for providing a writing or image on the underlying ceramic remembrance stone or cameo.

Reference is now made to the respective and plan views illustrated in FIGS. 7 and 8. These figures describe a further important aspect of the present invention, which includes the provision for a holder 40 for the transfer sheet 42. It is the transfer sheet that enables an inscribed message to be formed on the cameo 20. The holder 40 incorporates a plastic mask 44 of a particular predetermined shape or configuration. The holder 40 retains the transfer sheet and is constructed and arranged to stretch the transfer sheet tightly over the ceramic cameo 20. The holder thus corresponds substantially in shape to that of the cameo 20. With the use of this holder and mask, the transfer process occurs only in a predefined work area 45, while the plastic mask at the same time keeps the transfer material from rubbing off onto surfaces outside this predefined work area. The holder and integrated mask may be in the form of a precut poly layer that is used to impress writing or images onto the underlying ceramic surface by way of this transfer layer using stylus 46.

Figure 9:
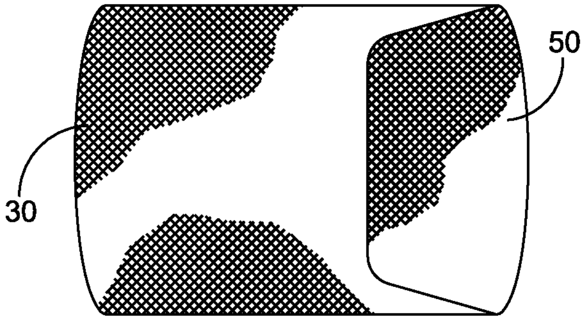
FIG. 9 is a schematic diagram illustrating one form of sleeve with a flap.

As illustrated previously, for example in FIGS. 3 and 4, there is depicted a sleeve 30 that may be considered in those views as open at both ends. The sleeve can be used in that manner. However, it is preferred that at least one end of the sleeve be closed, and even more particularly, that both ends be closed so that the remembrance stone or cameo is completely sealed. In this regard, reference is now made to several different embodiments illustrated in FIGS. 9-12 that show several different methods of sealing the ends. For example, in FIG. 9, there is provided an end flap 50. Even a velcro-type connection could be used between the end flap 50 and the sleeve 30.

Figure 10:
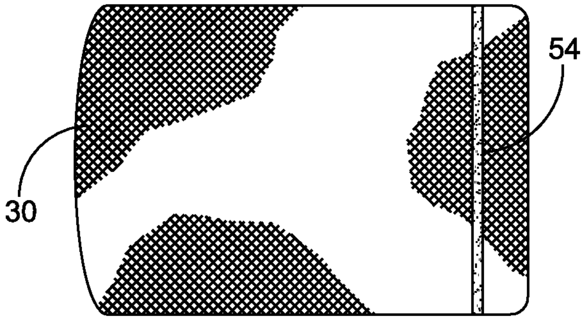
FIG. 10 is a schematic diagram illustrating of another form sealing the sleeve by means of an adhesive.

FIG. 10 illustrates another means of sealing preferably both ends of the sleeve 30. The ends can be sealed using a high-temperature adhesive applied at 54, such as is used for sealing gaskets in other high-temperature environments. In this connection, refer to the following description of the use of a high temperature silica-based gasket cement:

1. Use for a high-temperature rigid seal.
2. Adheres to all porous fibrous gasket materials.
3. Can be used to effect repairs of cracks on stoves, stovepipe and masonry.
4. Withstands up to 2000° F./1093° C.
5. 2 fluid oz. 59 ml. Squeeze tube.
6. Use by applying thin film over entire gasket channel or contact surface. Wait until tacky (10 minutes). Apply gasket material firmly into place.
7. Elevate to 250° F./121° C. to fully cure.

Figure 11:
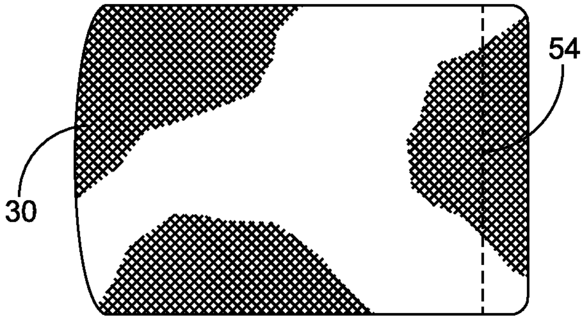
FIG. 11 is a further schematic depiction illustrating a means for sealing the sleeve by means of a stitching with threads.

The ends of the sleeve 30 can also be sewn together as illustrated in FIG. 11 at 56. Any one of several different high-temperature threads may be used for this stitching:

1. Nomex continuous is 662° F. short term to 800° F.
2. Kevlar continuous is 320° F. short term to 600° F.

3. Fiberglass continuous is 1000° F. short term to 1200° F.
4. 304/Inox Stainless continuous is 1200° F. short term to 1400° F.
5. Quartz continuous is 1800° F. short term to 2000° F.
6. Alumina continuous is 2200° F. short term to 2300° F.

Figure 12:
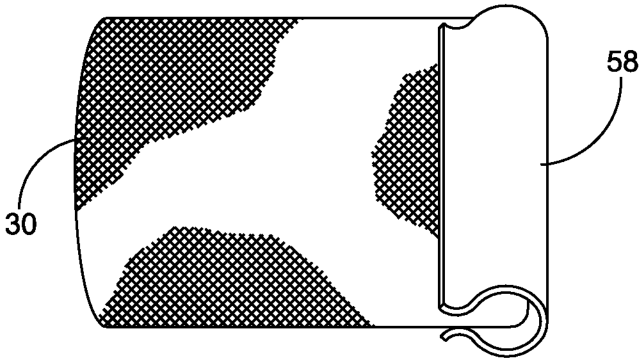
FIG. 12 is a schematic diagram illustrating the sleeve being closed by means of a mechanical clip or clamp.

Another alternative for sealing the end of the sleeve is depicted in FIG. 12. This may be in the form of a mechanical clamp or clip 58. This may be constructed of stainless steel or other high-temperature stable material in order to keep the piece thoroughly enclosed throughout the cremation process.

In the system and method of the present invention, the sleeve 30 is constructed and arranged so that it preferably provides a tight seal about the remembrance stone or cameo. This protects the stone or cameo from undesirable outside elements that exist during the cremation process. The sealing of the sleeve also constricts the amount of oxygen which comes into contact with the remembrance stone or cameo itself. In this way, any organic and/or inorganic materials that are purposefully placed on the inner surface of the sleeve burn or smolder at a controlled rate in a low-oxygen environment. In that way, a uniform appearance is provided on the remembrance stone or cameo to provide a preferred appearance, patina, or surface effect free of any burn marks or other marks that might occur without the use of the sleeve of the present invention.

Figure 13:
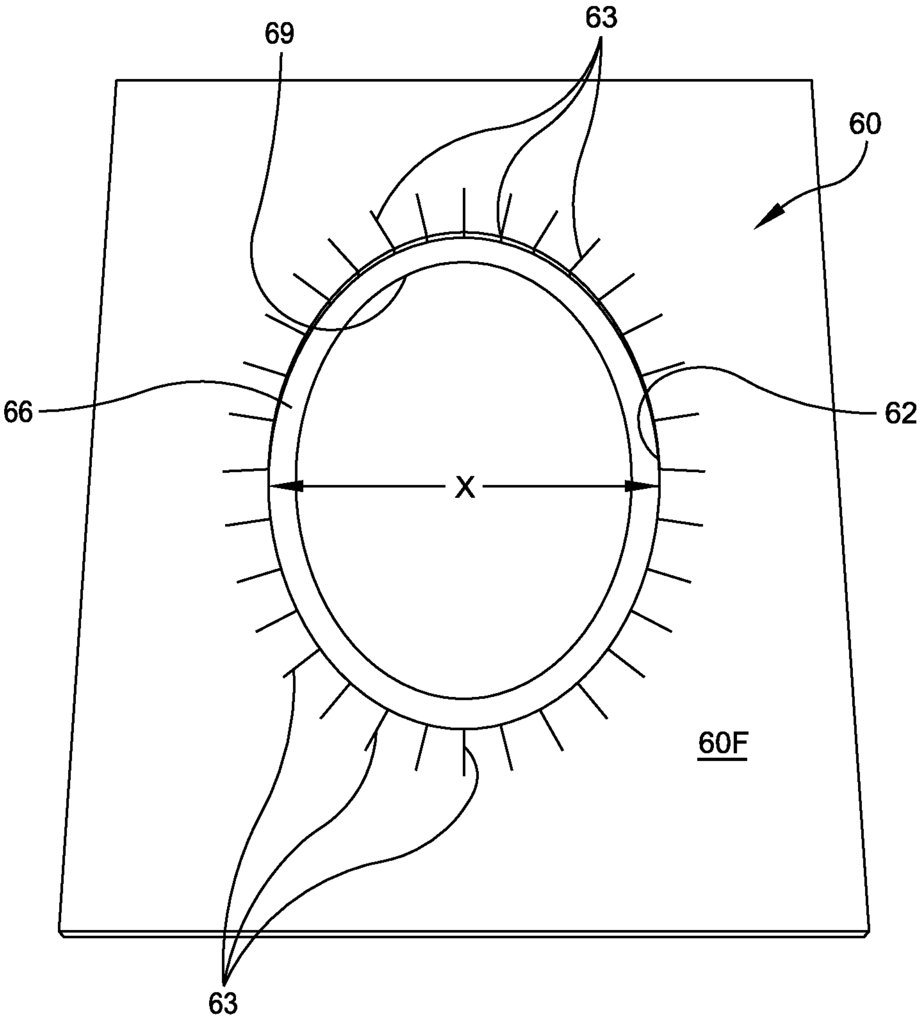
FIG. 13 is a plan view illustrating basically the same concept as illustrated in FIGS. 7 and 8 using a holder for the cameo.
Figure 14:
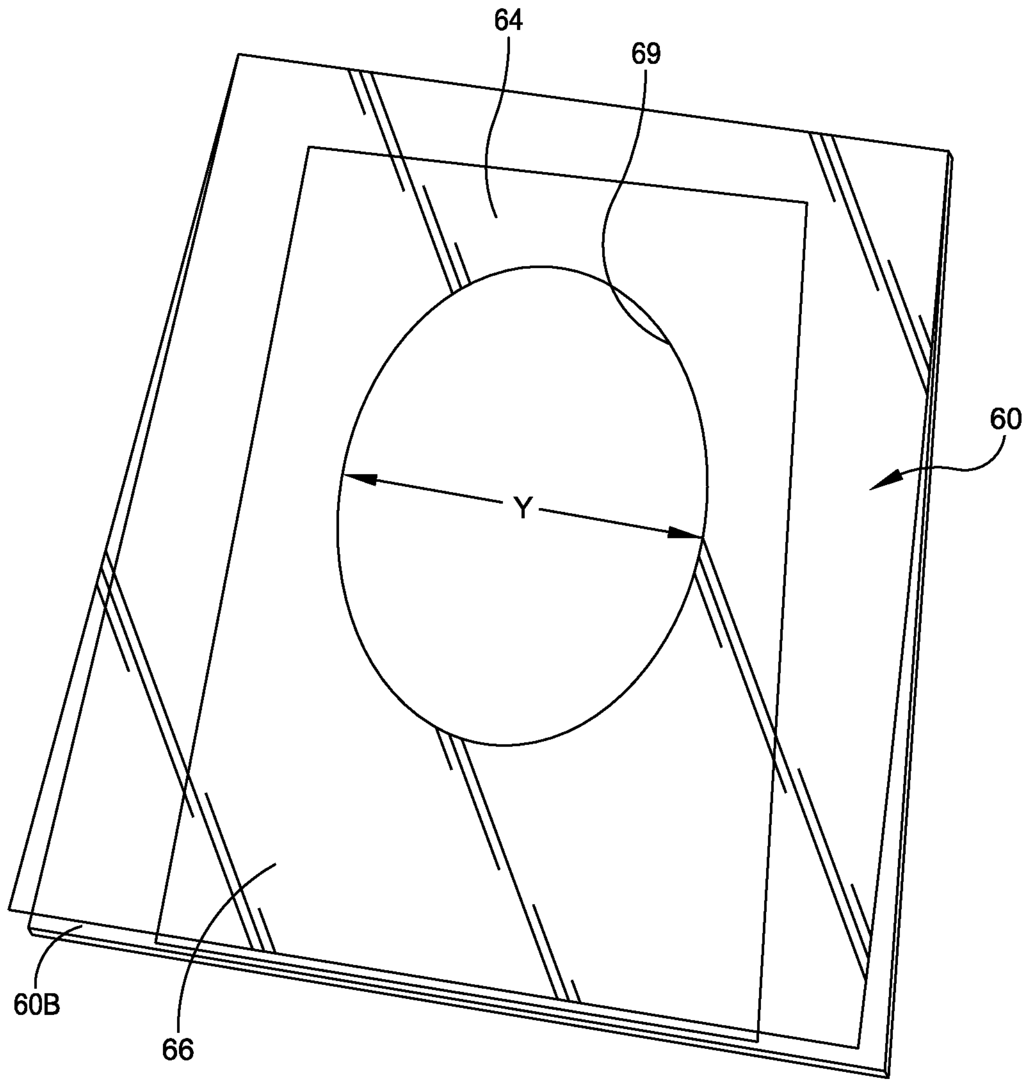
FIG. 14 is a rear view of the holder, transfer sheet and mask.
Figure 15:
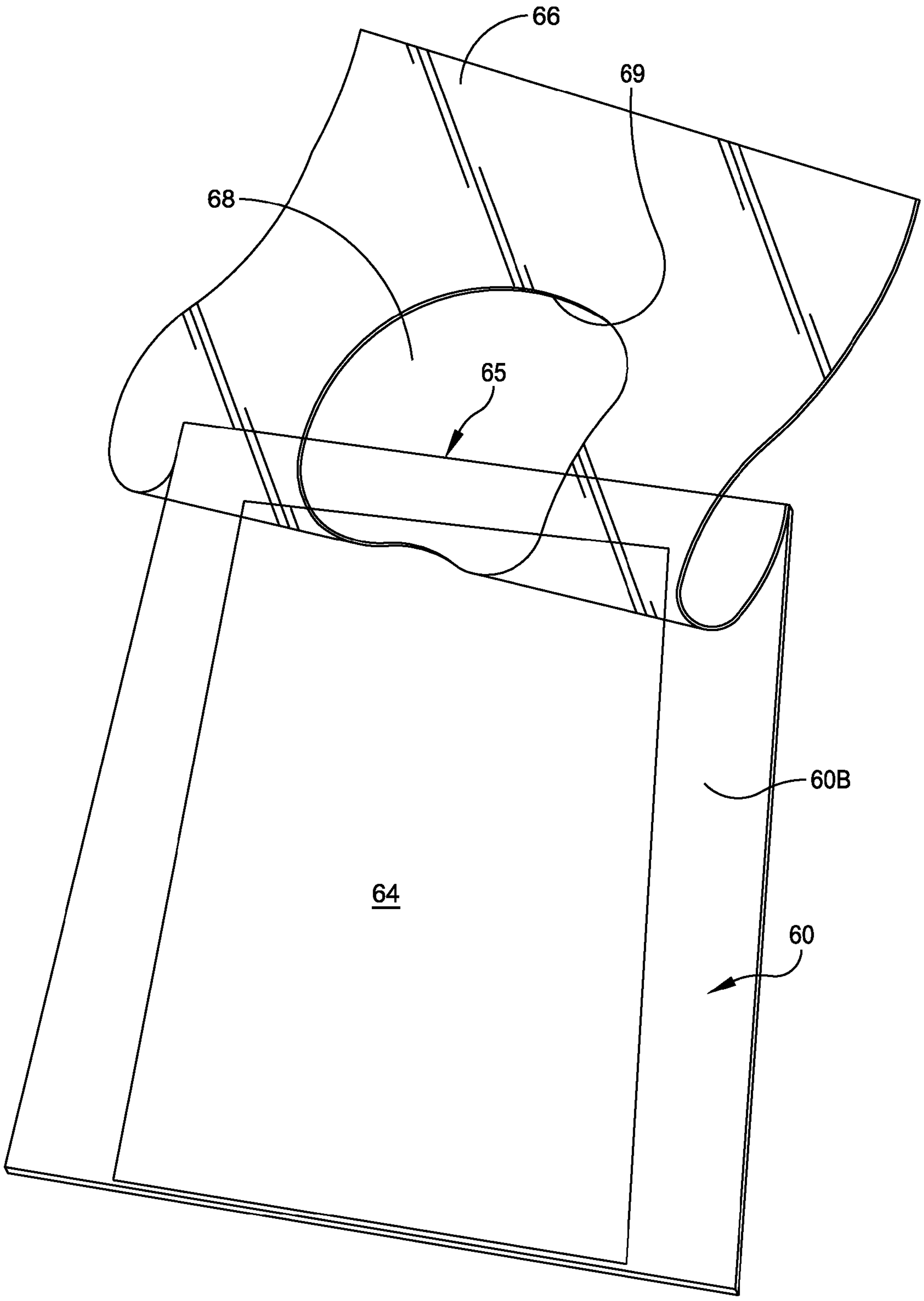
FIG. 15 is a view similar to that illustrated in FIG. 14 and showing the mask partially unfolded.
Figure 16:
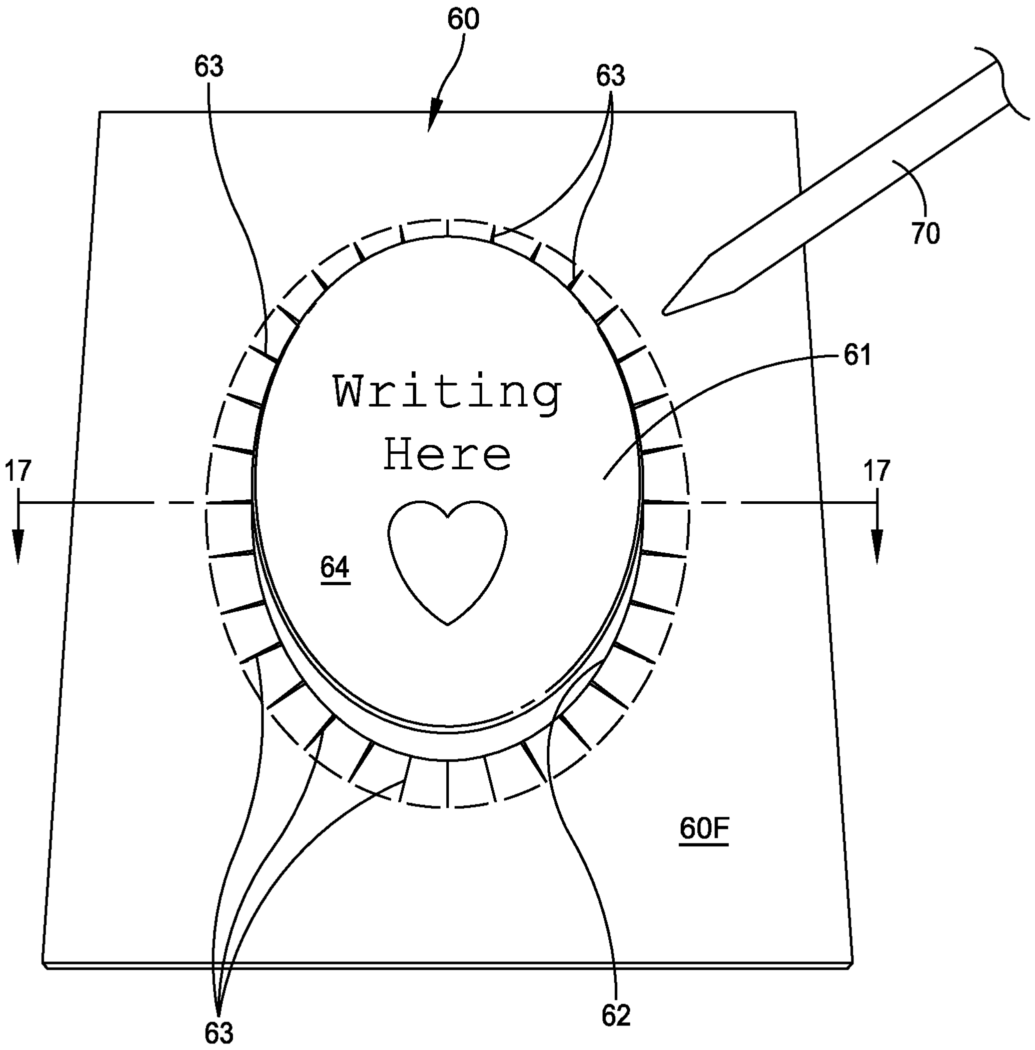
FIG. 16 is a view similar to that illustrated in FIG. 13 with the cameo now in place in the holder.
Figure 17:
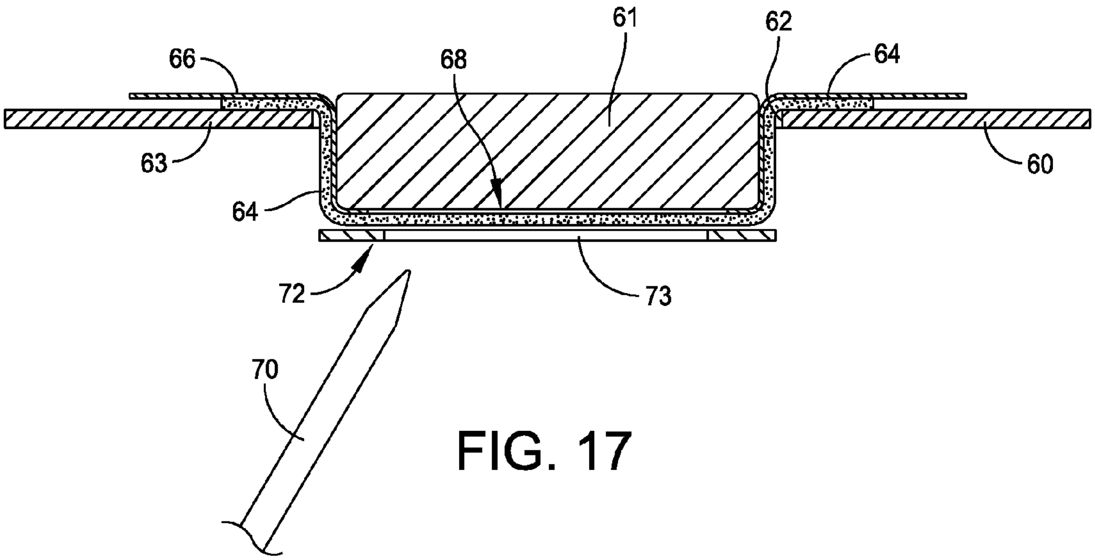
FIG. 17 is a cross-sectional view taken along line 17-17 of FIG. 16.

Reference is now made to a further embodiment of the application illustrated in FIGS. 13-17. The purpose of this device is to provide a relatively simple means by which an inscription in the form of a personalized message, can be formed on the cameo. FIGS. 13-15 illustrate the basic component of the holder while FIGS. 16 and 17 illustrate the cameo 61 in position within the holder 60.

With reference to FIGS. 13-15, there is shown a substantially rectangular holder 60 that may be in the form of a piece of cardboard or plastic and that has a central hole or passage 62. This passage 62, in the illustrated embodiment, is oval in shape so as to correspond in substance to the oval shape of the cameo. In FIG. 13 the cameo is not yet in place. The holder 60 is substantially planar and includes a front side 60F and a rear side 60B. About the middle passage 62 in the holder 60, there are a series of spaced apart slits 63. Each of these slits extend from the passage 62 substantially radially outward therefrom. The purpose of the slits is to provide some limited displacement of the passage when the cameo is inserted within the passage 62. In FIG. 13 the cross dimension or minimum diameter X is illustrated. This dimension would be preferably slightly less than the like outer diameter or dimension of the cameo 61.

Reference is now made to FIGS. 14 and 15 for the construction at the rear of the holder 60. This construction includes a transfer sheet 64 that has a similar shape to that of the holder 60 but is small in size. The transfer sheet 64 is meant to completely cover the passage 62.

Overlying the transfer sheet 64 and the holder 60 is a mask 66 that is preferably transparent. This mask 66 also has an oval center passage 69 as illustrated in FIG. 14. One edge of the mask 66 is secured to the holder 60 along the edge 65. In essence, the mask 66 is essentially hinged to the holder 60 along preferably the complete length of the edge 65.

The components illustrated in FIGS. 13-15 form a basic holder in which the cameo 61 engages through the holder passage 62. In this regard, refer to the cross-sectional view of FIG. 17 that shows the cameo 61 positioned within the passage 62. At the same time, the transfer sheet 64 is moved outward to extend about the cameo 61. The holder essentially retains the transfer sheet so as to stretch the transfer sheet over the inscription surface 68 of the cameo 61. The mask 66 at its opening 69 provides an essential work surface of the transfer sheet while at areas beyond the mask opening 69, the transfer sheet is covered In this way only inscriptions can be formed directly on the inscription surface 68 of the cameo. For this purpose a stylist 70 that may be a pen or any similar implement can be used.

With reference to FIG. 16, the cameo 61 is shown within the holder 60. This may be retained in place by virtue of there being some separation at slits 63 of the holder for there to be a firm grasp between the holder 60 and the cameo 61. FIG. 16 also illustrates the inscription surface at 68 and furthermore illustrates the use of a stylus 70 that may be used for writing through the transfer sheet onto the cameo surface 68.

The cross-sectional view of FIG. 17 clearly indicates the placement of all of the components. This includes the transfer sheet 64 shown disposed over the cameo inscription surface 68. The transfer sheet 64 carries, on the surface facing the inscription surface 68, a material which is actually a form of a ceramic underglaze. One may use any type of a stylus or even a ballpoint pen to write the inscription by bearing down on the transfer sheet 64. This transfer sheet material may be a material made by Amaco and identified as a "Minnesota Clay Graffito Paper." This will leave an inscription on the cameo that has ceramic characteristics and thus able to withstand substantial temperatures. FIG. 17 also illustrates a secondary overlay 72 which may be used to trace a pre-printed image such as illustrated at 73 (configured opening) in FIG. 17 onto the ceramic cameo. This opening enables one to inscribe a particular letter, saying or logo through the transfer sheet onto the cameo. The secondary overlay is illustrated in FIG. 17 as being disposed adjacent to the transfer sheet and can be held against the transfer sheet by some type of a holder. The secondary overlay 72 may also be constructed of a larger size so that it overlays substantially the entire dimensions of the transfer sheet. This would also hold the overlay sheet 72 in position when the cameo is engaged with the holder as illustrated in FIG. 17. The depiction of FIG. 17 shows the stylus 70 that is engageable with the transfer sheet. In actual practice, the configuration would be placed on a table or other firm surface and a pen would press down from above rather than from below as illustrated in FIG. 17.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A method of inscribing a personal message to a heat resistant cameo that is intended to be included with a deceased person during a cremation process, said method comprising:

providing a holder having a middle passage constructed and arranged to receive the cameo therein, said cameo having a predetermined inscription surface upon which a personal message is to be inscribed;

providing a transfer sheet behind the holder;

placing the cameo through the middle passage while the holder retains the transfer sheet to stretch the transfer sheet over the inscription surface of the cameo;

providing a mask that is disposed under the transfer sheet;

said mask having a middle hole therein that is aligned with the middle passage of the holder;

placing the mask so that the middle hole is in alignment with the holder passage; and inscribing a personal message onto said cameo by applying a pressure to an exposed surface of the transfer sheet through said hole in said mask.

2. The method of claim 1 including providing a stylus for writing against the transfer sheet.

3. The method of claim 2 including providing relief slits about the passage in the holder in order to allow for limited expansion of the passage in the holder when the cameo is inserted in the holder.

4. The method of claim 3 wherein the transfer sheet is a separate sheet inserted between the holder and mask.

5. The method of claim 4 including supporting the mask from the holder along an edge of the mask.

6. The method of claim 5 including providing a second mask having an inscription opening and disposing the second mask outside of the transfer sheet for the purpose of tracing a pre-printed image onto the transfer sheet.

7. A method of inscribing a personal message to a heat resistant cameo that is intended to be included with a deceased person during a cremation process, said method comprising:

providing a holder having a middle passage constructed and arranged to receive the cameo therein, said cameo having a predetermined inscription surface upon which a personal message is to be inscribed;

providing a transfer sheet;

providing a mask having a middle hole therein that is to be aligned with the middle passage of the holder;

disposing the transfer sheet and mask in adjacent juxtaposition;

placing the cameo through the middle passage of the holder while the holder retains edges of the transfer sheet and mask to stretch the transfer sheet over the inscription surface of the cameo so that the middle hole in the mask is in alignment with the middle passage of the holder; and inscribing a personal message onto said cameo by applying a pressure to an exposed surface of the transfer sheet through said hole in said mask.

8. The method of claim 7 including providing a stylus for writing against the transfer sheet.

9. The method of claim 7 including providing relief slits about the passage in the holder in order to allow for limited expansion of the passage in the holder when the cameo is inserted in the holder.

10. The method of claim 7 wherein the transfer sheet is a separate sheet inserted between the holder and mask.

11. The method of claim 7 including supporting the mask from the holder along an edge of the mask.

12. The method of claim 7 including providing a second mask having an inscription opening and disposing the second mask outside of the transfer sheet for the purpose of tracing a pre-printed image onto the transfer sheet.

13. The method of claim 7 wherein the mask is disposed between the transfer sheet and the cameo.

* * * * *